US010451803B2

(12) United States Patent
Chen et al.

(10) Patent No.: US 10,451,803 B2
(45) Date of Patent: Oct. 22, 2019

(54) MULTIMODE OPTICAL TRANSMISSION SYSTEM EMPLOYING MODAL-CONDITIONING FIBER

(71) Applicant: Corning Optical Communications LLC, Hickory, NC (US)

(72) Inventors: Xin Chen, Corning, NY (US); John Douglas Coleman, Hickory, NC (US); Donald Kennedy Hall, Mooresville, NC (US); Ming-Jun Li, Horseheads, NY (US)

(73) Assignee: Corning Optical Communications LLC, Charlotte, NC (US)

(*) Notice: Subject to any disclaimer, the term of this patent is extended or adjusted under 35 U.S.C. 154(b) by 0 days.

(21) Appl. No.: 14/707,841

(22) Filed: May 8, 2015

(65) Prior Publication Data
US 2015/0333830 A1    Nov. 19, 2015

Related U.S. Application Data

(60) Provisional application No. 61/994,423, filed on May 16, 2014.

(51) Int. Cl.
*G02B 6/26* (2006.01)
*H04B 10/2581* (2013.01)
*G02B 6/14* (2006.01)

(52) U.S. Cl.
CPC ............ *G02B 6/268* (2013.01); *G02B 6/14* (2013.01); *G02B 6/262* (2013.01); *H04B 10/2581* (2013.01)

(58) Field of Classification Search
CPC ................................ G02B 6/262; G02B 6/268
See application file for complete search history.

(56) References Cited

U.S. PATENT DOCUMENTS 4,641,914 A    2/1987  Sheem
4,723,828 A *  2/1988  Garel-Jones ....... G02B 6/02285
                                                        359/900
(Continued)

FOREIGN PATENT DOCUMENTS

DE    102012020589 A1    4/2014    ............... G02B 6/26
DE    102012020590 A1    4/2014    ............... G02B 6/26
(Continued)

OTHER PUBLICATIONS

Patent Cooperation Treaty, International Search Report for application No. PCT/US2015/029947, dated Aug. 27, 2015, 14 pages.
(Continued)

*Primary Examiner* — Daniel Petkovsek
(74) *Attorney, Agent, or Firm* — Adam R. Weeks

(57) ABSTRACT

A multimode optical fiber transmission system that employs an optical fiber with at least one modal-conditioning fiber is disclosed. The system includes a single-mode transmitter that generates modulated light having a wavelength between 800 nm and 1600 nm; an optical receiver configured to receive and detect the modulated light; a multimode optical fiber that defines an optical path between the single-mode transmitter and the optical receiver, the multimode optical fiber having a core with a diameter $D_{40}$ and a refractive index profile configured to optimally transmit light at a nominal wavelength of 850 nm; and at least one modal-conditioning fiber operably disposed in the optical path to perform at least one of modal filtering and modal converting of the optical modulated light.

17 Claims, 10 Drawing Sheets

(56) References Cited

U.S. PATENT DOCUMENTS

| | | | | |
|---|---|---|---|---|
| 6,185,346 | B1* | 2/2001 | Asawa | G02B 6/14 385/28 |
| 6,363,195 | B1* | 3/2002 | Abbott, III | G02B 6/02214 385/123 |
| 6,758,600 | B2 | 7/2004 | Del Grosso et al. | 385/71 |
| 6,869,227 | B2 | 3/2005 | Del Grosso et al. | 385/71 |
| 7,147,383 | B2 | 12/2006 | Sullivan | 385/59 |
| 7,237,966 | B2 | 7/2007 | Quinby et al. | 385/78 |
| 7,283,701 | B2* | 10/2007 | Hallemeier | G02B 6/14 385/15 |
| 7,724,995 | B2* | 5/2010 | De Barros | G02B 6/14 385/28 |
| 8,251,591 | B2* | 8/2012 | Barnes | G02B 6/3895 385/59 |
| 8,873,967 | B2 | 10/2014 | Barnes et al. | 398/141 |
| 2005/0207709 | A1 | 9/2005 | Del Grosso et al. | 385/71 |
| 2006/0034573 | A1* | 2/2006 | Guan | H04B 10/2581 385/123 |
| 2010/0098428 | A1 | 4/2010 | Barnes et al. | 398/140 |
| 2013/0039626 | A1 | 2/2013 | Bickham et al. | 385/124 |
| 2013/0266033 | A1 | 10/2013 | Tan et al. | |
| 2013/0322825 | A1 | 12/2013 | Cooke et al. | |
| 2014/0086578 | A1* | 3/2014 | Bickham | G02B 6/02261 398/29 |
| 2015/0331181 | A1 | 11/2015 | Chen et al. | |
| 2015/0333829 | A1 | 11/2015 | Chen et al. | |

FOREIGN PATENT DOCUMENTS

| | | | |
|---|---|---|---|
| WO | 2014011525 A2 | 1/2014 | |
| WO | 2014063901 | 5/2014 | |
| WO | WO2014/063901 A1 | 5/2014 | G02B 6/44 |

OTHER PUBLICATIONS

Corning Cable Systems, Plug & Play Systems with Multi-Fiber Connectors: Polarity Explained, AEN, Revision 9, Engineering Services Department, Revised May 5, 2010, 7 pages.

Ryf, et al., "Mode-multiplexed transmission over conventional graded-index multimode fibers," Jan. 12, 2015, vol. 23, Optics Express 235, 12 pages.

Zollinger, R., HD MPO System, Convincing Cabling Solutions, Dec. 2013, 30 pages.

John D Downie, Jason E. Hurley, Dmitri V Kuksenkov, Christopher M. Lynn, Andrey E Korolev, Vladimir N Nazarov, "Transmission of 112 Gb/s PM-QPSK signals over up to 635 km of multimode optical fiber", Optics Express, vol. 19 Issue 26, pp. B363-B369 (2011).

Cisco 40 GBASE QSFP Modules Data sheet http://www.cisco.com/c/en/us/products/collateral/switches/nexus-9000-series-switches/datasheet-c78-730160.html.

Sorin et al; "Interoperability of Single-Mode and Muitmode Data Links for Data Center and Optical Backplane Applications"; Optical Society of America; 2013; 3 Pages.

\* cited by examiner

MULTIMODE OPTICAL TRANSMISSION SYSTEM EMPLOYING MODAL-CONDITIONING FIBER

PRIORITY APPLICATION

This application claims the benefit of priority under 35 U.S.C. § 119 of U.S. Provisional Application Ser. No. 61/994,423 filed on May 16, 2014, the content of which is relied upon and incorporated herein by reference in its entirety.

FIELD

The present disclosure relates to optical transmission systems that employ multimode optical fiber, and in particular relates to an optical fiber transmission system that employs at least one modal-conditioning fiber.

BACKGROUND

The entire disclosure of any publication or patent document mentioned herein is incorporated by reference, including U.S. Publications No. 2013/0266033 and 2013/0322825.

Optical fiber transmission systems are employed in data centers to establish communication between devices such as routers, servers, switches and storage devices. The optical fiber transmission system typically utilizes a trunk cable (e.g., tens to hundreds of meters long) that carries many optical fibers (e.g., twelve, twenty-four, forty-eight, etc.). Each end of the trunk cable optically connects to a breakout assembly to transition from MPO-style multifiber trunk connectors to other types of connectors which are then interfaced with patch cords or plugged directly into equipment ports, thereby establishing an optical path between the devices. The breakout assembly is frequently housed in a break-out module.

Data centers are configured with cable assemblies containing multimode optical fibers. Such fibers are used because the light sources in the transceivers in the optical devices are multimode light sources. Also, historically it has been easier to work with multimode fiber than single-mode fiber. Unfortunately, multimode fiber has a smaller bandwidth-distance product due to modal dispersion, which makes it difficult and expensive to extend the reach or to increase the data rate of the optical fiber transmission system.

In addition, the existing multimode fibers are optimized for operation at a nominal wavelength of 850 nm at which multimode fibers have high chromatic dispersion. For longer reach or higher data rate transmission, it is desired to have an operating wavelength of nominally around 1300 nm where the chromatic dispersion is the lowest. For example, many single-mode transceivers, such as LR and LRM transceivers, are designed and operated at a nominal wavelength of 1310 nm. Some of the transceivers operating at a wavelength of about 1300 nm involve CWDM or four wavelengths propagating with the same optical fiber at 10 Gb/s for each wavelength, so that the total data rate for each transceiver is 40 Gb/s.

The wavelengths for each operating channel are nominally 1270 nm, 1290 nm, 1310 nm and 1330 nm. Traditionally they are operated with single-mode fibers, with the exception of an LRM transceiver, which can operate with a single-mode to multimode fiber patch cord with offset splicing so that multimode fiber can also be used. But recently there has been increasing interest in using the single-mode transceiver with multimode fiber in data center for improved interoperability, providing a smooth upgrade path and for easier logistical management, all of which provide economic and financial benefits.

Consequently, it is advantageous to have ways of improving the performance of a multimode optical fiber transmission system without incurring the time, labor and expense of having to replace the multimode fibers.

SUMMARY

Aspects of the disclosure are directed to optical transmission systems that operate at a wavelength in the range from 800 nm to 1600 nm and that employ a single-mode optical transmitter and an optical receiver optically coupled to respective ends of an optical fiber path comprising a multimode fiber designed for operation at a wavelength of about 850 nm. The optical fiber path employs at least one modal-conditioning fiber. The modal-conditioning fiber can serve as: 1) a modal-converting fiber when used adjacent the transmitter for converting the launching light close to the fundamental LP01 mode of the multimode fiber; 2) a modal-filter fiber when used adjacent the receiver for substantially filtering out the higher-order modes; 3) as both a modal-converting fiber and a modal-filter fiber when operably disposed within the optical path between the optical transmitter and the receiver; 4) as both a modal-converting fiber and a modal-filtering fiber when first and second modal-conditioning fibers are used at respective first and second ends of the multimode fiber adjacent the transmitter and the receiver.

When the modal-conditioning fiber is used as a modal-converting fiber, it ensures that primarily the fundamental mode of the multimode fiber is launched or excited. When the modal-conditioning fiber is used as a modal-filter fiber, it ensures that only light from a certain radial region of the multimode fiber or in most cases from the fundamental mode of the multimode fiber is detected. This enables various embodiments of the system to have a system bandwidth for the received signals of: greater than 2 GHz·km; greater than 4 GHz·km; greater than 8 GHz·km; greater than 10 GHz·km; greater than 15 GHz·km; or greater than 20 GHz·km.

The modal-conditioning fiber can have a relatively short length, e.g., as short as 5 mm, but it can be any reasonable length longer than 5 mm to achieve the same functionality. The modal-conditioning fiber can be either a single-mode fiber, a few-mode fiber or a multimode fiber having a core with a diameter in a select range, e.g., smaller than the core diameter of the main multimode fiber. In an example involving launching and/or receiving substantially only the fundamental mode of the multimode fiber, the core diameter of the modal-conditioning fiber can be: a) in the range from 10 µm and 23 µm.

In some other embodiments, if the purpose of the modal-conditioning fiber is to strip away just the very high-order modes that travel near the edge of the multimode fiber core, the core size of the modal-conditioning fiber can be in the range from 30 µm and 45 µm. In this case, the optical fiber can be used with a smaller-area multimode photo-receiver designed for 10 Gb/s to 32 Gb/s operation, and examples can work at even higher data rates of 40 Gb/s, 50 Gb/s or above. In other embodiments, the core size (diameter) of the modal conditioning fiber is 50 microns or less, or is between 10 microns and 50 microns.

The at least one modal-conditioning fiber can be integrated within the optical path in any of the components that define the optical path, such as in one or more jumpers, as part of a connector, or concatenated to a section of multimode fiber either within a breakout module or a break out harness (i.e., a fan-out harness). It can even be spliced to form part of the above-mentioned components or devices at one or both ends of the optical fiber path, i.e., connected to either the transmitter and/or receiver. In examples, the optical transmission system that utilizes the mode-conditioned optical fibers disclosed herein supports a data rate of 10 Gb/s, 16 Gb/s, 25 Gb/s or even higher.

An aspect of the disclosure is an optical transmission system for transmitting data. The system includes: a single-mode transmitter that generates modulated light having a wavelength between 800 nm and 1600 nm; an optical receiver configured to receive and detect the modulated light; a multimode optical fiber that defines an optical path between the single-mode transmitter and the optical receiver, the multimode optical fiber having a refractive index profile configured to transmit light an operating wavelength of about 850 nm; at least one modal-conditioning fiber operably disposed in the optical path and having a length of at least 5 mm, and a core diameter $D_c$ and wherein 10 µm<$D_c$<50 µm; and a modal bandwidth of at least 2 GHz·km.

Another aspect of the disclosure is an optical transmission system for transmitting data. The system includes: first and second transceivers each including a single-mode (SM) transmitter that generates modulated light having a wavelength between 800 nm and 1600 nm, and each including an optical receiver configured to receive and detect the modulated light; a first multimode optical fiber that defines a first optical path between the SM transmitter of the first transceiver and the receiver of the second transceiver; a second multimode optical fiber and that defines a second optical path between the SM transmitter of the second transceiver and the receiver of the first transceiver; wherein the first and second multimode optical fibers have a refractive index profile configured to transmit light at an operating wavelength of about 850 nm; at least one first modal-conditioning fiber operably disposed in the first optical path; at least one second modal-conditioning fiber operably disposed in the first optical path; wherein the at least one first and at least one second modal-conditioning fibers each has a length of at least 5 mm and a core diameter $D_c$ wherein 10 µm<$D_c$<50 µm; and wherein the first and second optical paths each supports a modal bandwidth of at least 2 GHz·km.

Another aspect of the disclosure is a method of transmitting optical signals over an optical path of an optical transmission system. The method includes: generating single-mode modulated optical signals at a wavelength in a range between 800 nm and 1600 nm; transmitting the optical signals over an optical path having a modal bandwidth of at least 2 GHz·km and defined by a length of multimode optical fiber having a refractive index profile configured to optimally transmit light at an operating wavelength of about 850 nm; performing modal conditioning of the transmitted optical signals with at least one modal-conditioning fiber operably disposed in the optical path and having a length at least 5 mm, and having a core diameter $D_c$, wherein $D_c$<50 µm; and receiving the transmitted and mode-conditioned optical signals at a receiver.

Another aspect of the disclosure is a modal-conditioning fiber assembly of N fibers. The assembly includes: a first fiber array of first fibers T=1 to N/2 and a second fiber array of second fibers R=[(N/2)+1] to N, for N being an even number greater than 2, and wherein one end of the first and second fiber arrays terminate at first connection locations and another end of the first and second fibers terminate at second connection locations, wherein each fiber T and each fiber R comprises a length of mode-conditioning fiber having a length of 5 mm or greater and a core diameter $D_c$, wherein $D_c$<50 microns; and wherein pairs (T, R) of fibers T and R are defined at the first connection locations.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operations of the various embodiments. As such, the disclosure will become more fully understood from the following Detailed Description, taken in conjunction with the accompanying Figures, in which.

DETAILED DESCRIPTION

Figure 1A:
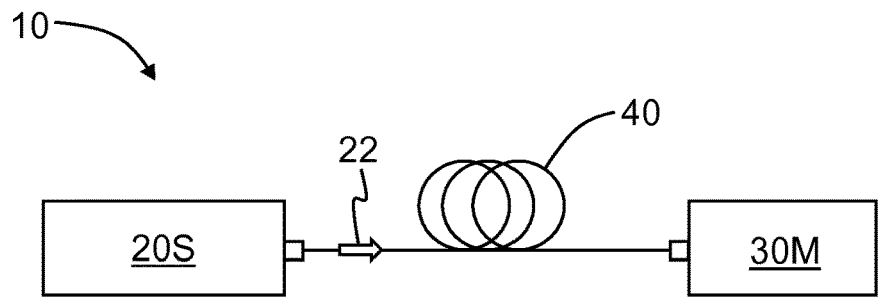
FIG. 1A is a schematic diagram of an optical fiber transmission system that employs a single-mode transmitter and a multimode receiver optically connected by a multimode optical fiber.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

In the description below, The term "relative refractive index," as used herein in connection with the optical fibers and fiber cores discussed below, is defined as:

$$\Delta(r) = [n(r)^2 - n_{REF}^2]/2n(r)^2,$$

where n(r) is the refractive index at radius r, unless otherwise specified. The relative refractive index is defined at the operating wavelength, which is the wavelength where the multimode core of the optical fiber is designed to work optimally, e.g., where the differential mode delay is minimized. In one aspect, the reference index $n_{REF}$ is silica glass. In another aspect, $n_{REF}$ is the maximum refractive index of the cladding. The parameter $n_0$ is the maximum index of the index profile. In most cases, $n_0 = n(0)$.

As used herein, the relative refractive index is represented by Δ and its values are given in units of "%," unless otherwise specified. In cases where the refractive index of a region is less than the reference index $n_{REF}$, the relative refractive index is negative and is referred to as a "trench." The minimum relative refractive index is calculated at the point at which the relative index is most negative, unless otherwise specified. In cases where the refractive index of a region is greater than the reference index $n_{REF}$, the relative refractive index is positive and the region can be said to be raised or to have a positive index. The value of Δ(r) for r=0 is denoted $\Delta_0$.

The alpha parameter α as used herein relates to the relative refractive index Δ, which is in units of "%," where r is the radius (radial coordinate) of the fiber, and which is defined by $\Delta(r) = \Delta_0 \cdot [1-Q^\alpha]$, where $Q=(r-r_m)/(r_0-r_m)$, where $r_m$ is the point at which Δ(r) is the maximum $\Delta_0$ and $r_0$ is the point at which Δ(r) %=0. The radius r is in the range $r_i \leq r \leq r_f$, where Δ(r) is defined above, $r_i$ is the initial point of the α-profile, $r_f$ is the final point of the α-profile and α is an exponent that is a real number.

For a step index profile, α>10, and for a gradient-index profile, α<5. It is noted here that different forms for the core radius $r_0$ and maximum relative refractive index $\Delta_0$ can be used without affecting the fundamental definition of Δ. For a practical fiber, even when the target profile is an alpha profile, some level of deviation from the ideal situation can occur. Therefore, the alpha parameter α for a practical fiber is obtained from a best fit of the measured index profile. An alpha parameter in the range 2.05≤α≤2.15 provides a minimum for the differential mode delay (DMD) at 850 nm and an alpha parameter in the range 1.95≤α≤2.05 provides a minimum for the DMD at 1300 nm.

The modal bandwidth (or overfill bandwidth) of an optical fiber is denoted BW and is defined herein as using overfilled launch conditions at 850 nm according to IEC 60793-1-41 (TIA-FOTP-204), "Measurement Methods and Test Procedures: Bandwidth." The minimum calculated effective modal bandwidths BW can be obtained from measured DMD spectra as specified by IEC 60793-1-49 (TIA/EIA-455-220), "Measurement Methods and Test Procedures: Differential Mode Delay." The units of bandwidth for an optical fiber can be expressed in MHz·km, GHz·km, etc., and a bandwidth expressed in these kinds of units is also referred to in the art as the bandwidth-distance product. The modal bandwidth is defined in part by modal dispersion. At the system level, the overall bandwidth can be limited by chromatic dispersion, which limits the system performance at a high bit rate.

The limits on any ranges cited herein are considered to be inclusive and thus to lie within the range, unless otherwise specified.

The symbol "μm" means "micron" or "microns", and the symbol "μm" and the word "micron" or "microns" are used interchangeably herein.

The term "modal-conditioning fiber" is used to generally denote at least one fiber that performs modal conditioning as disclosed herein. In various examples, the modal-conditioning fiber can serve as: 1) a modal-converting fiber when used adjacent the transmitter for converting the launching light close to the fundamental LP01 mode of the multimode fiber; 2) a modal-filter fiber when used adjacent the receiver for substantially filtering out the higher-order modes; 3) as both a modal-converting fiber and a modal-filter fiber when operably disposed within the optical path between the optical transmitter and the receiver; 4) as both a modal-converting fiber and a modal-filtering fiber when first and second modal-conditioning fibers are used at respective first and second ends of the multimode fiber adjacent the transmitter and the receiver. The modal-conditioning fiber can comprise a single section of one type of optical fiber that performs modal conditioning or can comprise two or more sections of optical fiber wherein one or more of the sections perform the modal conditioning.

FIG. 1A is a schematic diagram of a prior art optical fiber transmission system ("system") 10 that employs a single-mode (SM) transmitter 20S that emits modulated light 22, and a multimode (MM) receiver 30M optically connected by a multimode optical fiber (MMF) 40 having a refractive index profile designed to optimally operate around a nominal wavelength of 850 nm, e.g., 840 to 860 nm (i.e., has an operating wavelength of 850 nm where mode dispersion is minimum) or at a wavelength in the range from 800 nm to 1600 nm. MM receiver 30 is configured to receive modulated light 22.

Figure 1B:
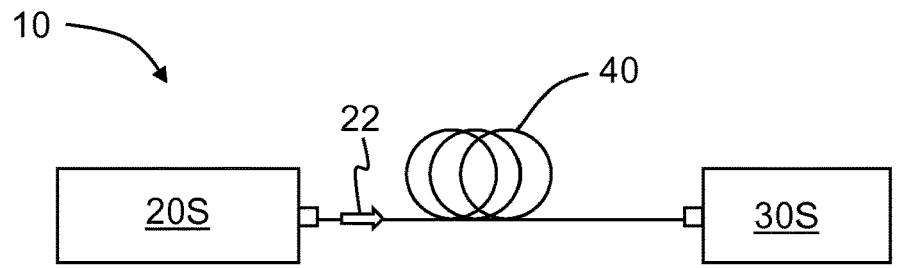
FIG. 1B is similar to FIG. 1A but that employs a single-mode receiver.

FIG. 1B is similar to FIG. 1A but employs a SM receiver 30S. The SM transmitter 20S can be one that is used in optical communications transceiver, such as an LR and LR4 transceiver. For LR4 transceiver, four wavelengths are co-propagating within the same fiber to reach an aggregated data rate of 40 Gb/s. The MM receiver 30M can be one that is used in VCSEL-based transceivers or a MM receiver used in a LRM transceiver operating around 1300 nm, or it can be a specially designed MM receiver. The SM transmitter 20S emits modulated light 22, which in an example has a nominal wavelength of 1300 nm. More generally, SM transmitter 20S emits modulated light (i.e., modulated optical signals) 22 having a wavelength in the range from 800 nm to 1600 nm, and the systems and methods disclosed herein can have operating wavelengths in this range. The SM transmitter 20S can also be a silicon-photonics-based transmitter, which in an example emits single-mode modulated light 22 having a wavelength in the range from 1250 nm to 1650 nm.

As noted above, there is increasing interest in using existing 850 nm MMF 40, such as OM2, OM3 or OM4 fiber, with SM transmitters 20S operating at a wavelength in the range from 800 nm to 1600 nm (and in particular at 1300 nm) to transmit data within or between data centers over distances of 100 m to 1000 m, depending on the system capability as limited by the power budget and the bandwidth of the MMF 40. The SM transmitter 20S discussed here can be one that is designed based on an existing standard to work with single-mode fiber. Such a SM transmitter 20S can be configured for use with MMF 40 to ensure better interoperability, upgradability, logistic management and/or compatibility with the existing installation. Note also that MMF 40 is designed for optimal operation at 850 nm, but that systems 10 of FIGS. 1A and 1B can operate at a nominal wavelength in the range from 1200 nm to 1600 nm, and in particular at a nominal wavelength of 1300 nm.

Figure 2:
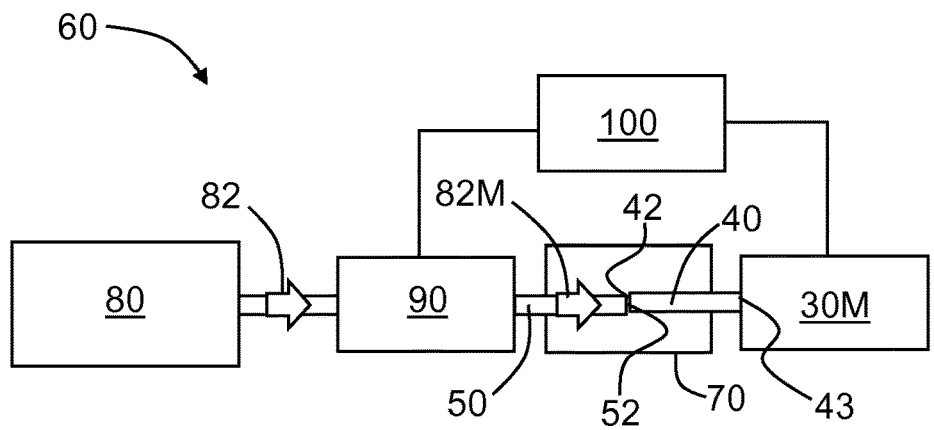
FIG. 2 is a schematic diagram of an example measurement system used to measure modal bandwidth.

Bandwidth measurements were conducted for the basic configuration of system 10 as shown in FIG. 1A. FIG. 2 is a schematic diagram of the measurement system 60 used to perform the bandwidth measurements. To emulate the launch condition from SM transmitter 20S, a cleaved end 52 of a short section of single-mode fiber 50 was butt coupled with a cleaved end 42 of a short section of MMF 40. Single-mode fiber section 50 and MMF section 40 were supported on an X-Y-Z alignment stage 70. A tunable laser 80 and an optical modulator 90 were optically connected to the input end of single-mode fiber section 50. A network analyzer 100 was optically connected to optical modulator 90 and an MM receiver 30M, which was optically coupled to an output end 43 of MMF section 40.

The single-mode fiber section 50 was initially aligned with the MMF section 40 (center to center). Controlled radial offsets $\delta r$ were then introduced in about 1 micron steps (increments) using X-Y-Z alignment stage 70, and the bandwidth of the fiber defined by single-mode fiber 50 and MMF section 40 was measured. Tunable laser 80 generated laser light 82 of nominally 1300 nm. The network analyzer 100 was used to send out sweeping RF-frequency signals to drive optical modulator 90, thereby forming optically modulated signals 82M from laser light 82.

The modulated optical signals 82M traveling in single-mode fiber section 50 were coupled into MMF section 40 and were then received by MM receiver 30M. The received signals were then analyzed by network analyzer 100, which produced a transfer function TF(f), often also referred to as "S21 signals," where f stands for frequency. The bandwidth of the optical fiber can be determined from the transfer function using standard techniques. For example, the bandwidth can be extracted at the 3 dBo point (defined by the 10·log(·) operator) or the 6 dBe point (defined by the 20·log(·) operator) of the transfer function TF(f).

Figure 3A:
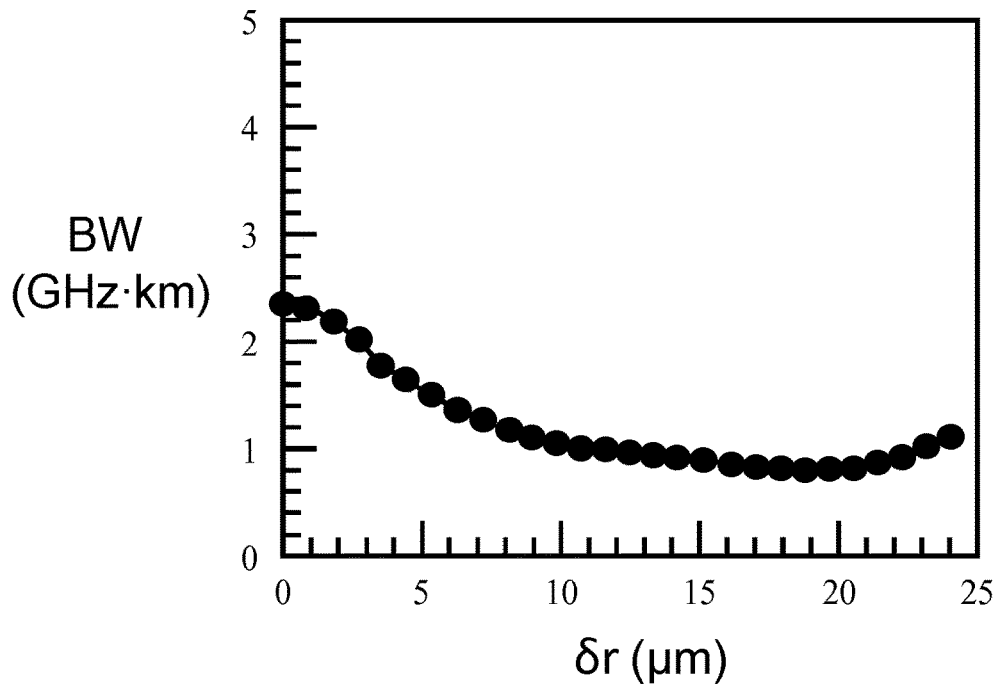
FIGS. 3A and 3B are plots of the radial offset δr (µm) versus modal bandwidth BW (GHz·km) at a wavelength of 1300 nm for two different OM4-type multimode fibers as measured using the measurement system of FIG. 2.
Figure 3B:
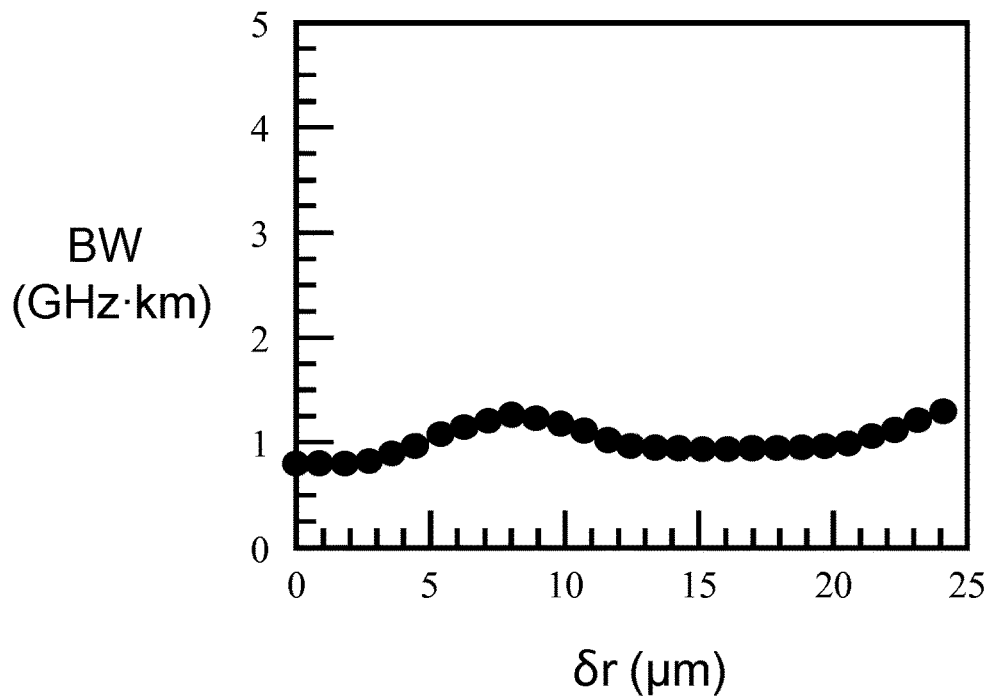
Figure 4:
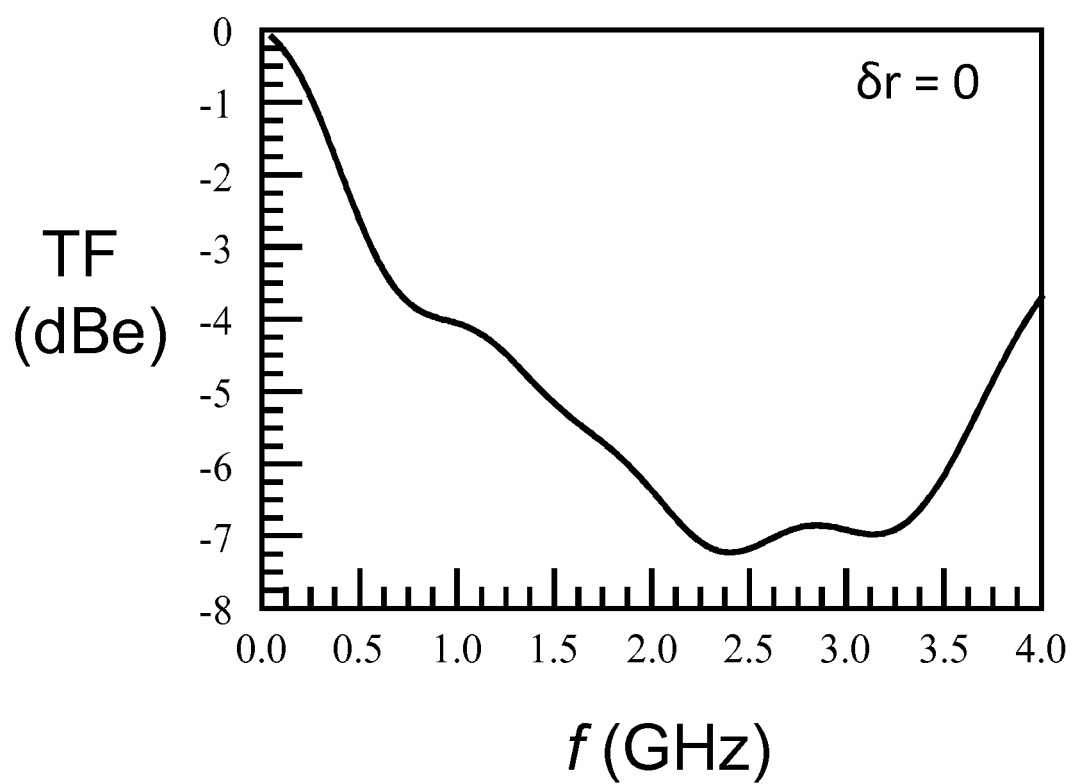
FIG. 4 is a plot of the measured transfer function TF(dBe) versus frequency f (GHz) for a center SM launch condition (i.e., δr=0) for a multimode fiber as measured using the measurement system of FIG. 2.

FIGS. 3A and 3B are plots of the radial offset $\delta r$ (μm) versus modal bandwidth BW (GHz·km) at 1300 nm for two different OM4-type MMF 40, as measured using measurement system 60. FIG. 4 is a plot of the measured transfer function TF (dBe) versus frequency f (GHz) for a center SM launch condition (i.e., $\delta r=0$) obtained using measurement system 60. With reference first to FIG. 3A, the first OM4 MMF 40 tested shows a modal bandwidth BW>1.5 GHz·km for $\delta r<5$ μm. With reference to FIG. 3B, the second OM4 MMF 40 tested shows a modal bandwidth BW<1 GHz·km over the same offset range. With over 1.5 GHz·km modal bandwidth BW, system 10 of FIG. 1 can have a reach of up to about 200 m at a data rate of 10 Gb/s. However, with less than 1 GHz·km modal bandwidth BW, the reach of system 10 of FIG. 1A is limited to 150 m or less, which is useful for some practical applications but not enough for applications (including many data center applications) demanding a longer system reach.

This observation is surprising when compared to the conventional understanding of SM launch at 850 nm, which assumes the coupling from a specific launch condition to nearby mode groups or mode groups with different radial positions is not substantial. The fact that a low bandwidth is observed even with SM-type of launch condition means that there is some level of mode coupling in MMF 40. The higher-order modes can be excited from the launch point and along the length of MMF 40. Additional coupling can occur likely from lower-order modes into higher-order modes at a nominal wavelength of 1300 nm (more so than those at 850 nm). Note that for MMF optimized for 850 nm operation, the time delays of the higher-order modes at 1300 nm are much higher than for the fundamental modes, which would form a right-tilt DMD chart.

Thus, even though more laser light 82M is launched near the center of MMF 40 or with a small spot size with an offset, this light gets coupled to higher-order modes that travel at greater radial positions. Note that OM3 and OM4 MMFs are made for operation at nominally 850 nm, so that its overfilled launch (OFL) modal bandwidth is only guaranteed to be above 500 MHz·km at 1300 nm. The light 82M propagating at larger radial positions has dramatically different delay when it reaches the other end of MMF 40. When the light of the higher-order modes is captured by MM receiver 30M, it degrades the system performance dramatically. Therefore, the system performance cannot support a reach of greater than about 200 m, or 300 m if the light from the whole core region of the MMF is detected by the receiver 30M.

FIGS. 5A through 5D are schematic diagrams of example optical transmission systems 104 that are modified versions of systems 10 from FIGS. 1A and 1B, and that include optical fibers ("fibers") 110 configured to reduce or substantially eliminate the detrimental effects of higher order modes on system performance. Fibers 150 can be referred to as "modal-conditioning fibers," where the mode conditioning can involve modal conversion, modal filtering, or both.

Figure 5A:
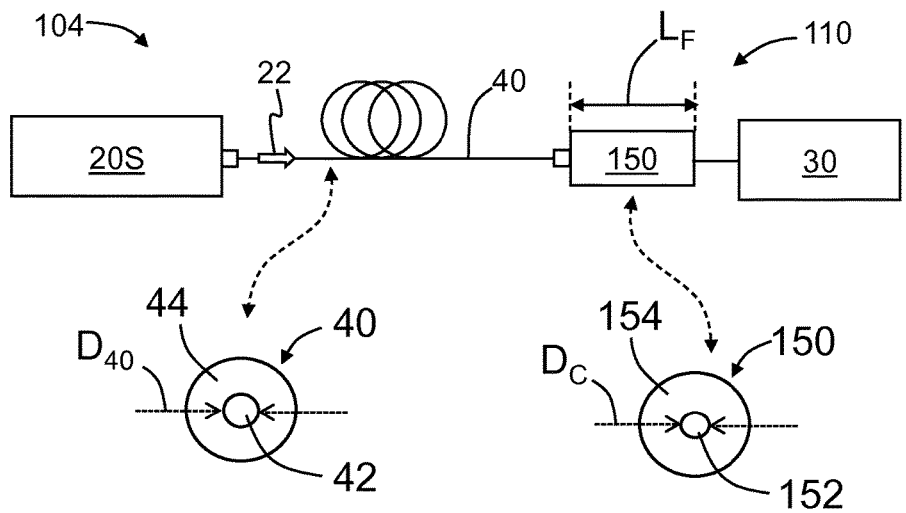
FIGS. 5A through 5D are schematic diagrams of example optical transmission systems configured to reduce the detrimental effects of differential mode delay by incorporating at least one modal-conditioning fiber in the optical path between the transmitter and the receiver.

With reference to FIG. 5A, system 104 includes either a single-mode or multimode receiver ("receiver") 30 and a mode-conditioning fiber 150 arranged between MMF 40 and receiver 30. In FIG. 5A, modal-conditioning fiber 150 serves as a modal-filtering fiber because it is disposed between MMF 40 and receiver 30. The two close-up insets of FIG. 5A show cross-sectional views of modal-filter fiber 150 and MMF 40. Modal-filter fiber 150 has a central core 152 surrounded by a cladding 154. Central core 152 has a diameter $D_c$. Modal-filter fiber 150 also has a length greater than 5 mm, and can typically have a length of 0.5 to 2 m but would work for any reasonable length greater than 5 mm. MMF 40 has a core 42 of diameter $D_{40}$ surrounded by a cladding 44.

Figure 5B:
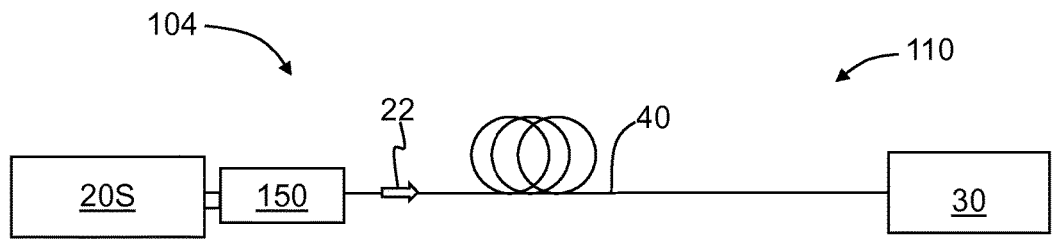

In FIG. 5B, only one modal-conditioning fiber 150 is disposed between the SM transmitter 20S and MMF 40. In this configuration, the modal-conditioning fiber 150 serves as a modal-converting fiber.

Figure 5C:
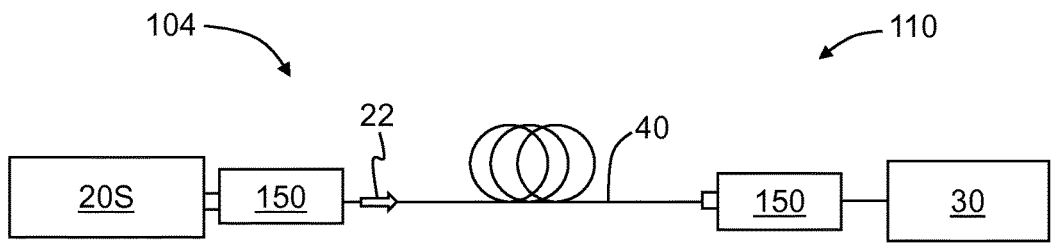

FIG. 5C is similar to FIGS. 5A and 5B and includes two modal-conditioning fibers. 150: one disposed between SM transmitter 20S and MMF 40 and that serves as a modal-converting fiber, and one disposed between receiver 30 and MMF 40 and that serves as modal-filtering fiber.

When the modal-conditioning fiber 150 is used as a modal converting fiber, in some of the embodiments, the purpose is to primarily excite the fundamental mode of the MMF 40. The MMFs OM2 to OM4 have cores 42 with diameters $D_{40}$ of 50 microns and mode-field diameters (MFDs) of fundamental mode LP01 of about 15 microns at 1310 nm wavelength, which is greater than that for the SMF-28® single-mode fiber. If single-mode fiber SMF-28® is used for modal-converting fiber 150, the performance is not expected to be optimal since the MFD of SMF-28® does not match the fundamental mode of MMF 40.

Further, in addition to exciting the fundamental mode of MMF 40, higher order modes are also excited and these have a much different time delay. To ensure optimal launch of the fundamental mode, the core diameter $D_c$ of the modal-converting fiber 150 should be close to that of the fundamental mode of MMF 40. Therefore, in one example, the range of the core diameter $D_c$ of the modal-converting fiber 150 is 10 μm≤$D_c$≤23 μm, and in another example is 12 μm≤$D_c$≤23 μm. Also in an example, the core delta ($\Delta_0$) is in the range from 0.2% to 2.0%. The modal-converting fiber 150 in this example can also optionally be a bend-insensitive fiber, e.g., by having a trench structure in the refractive index profile.

As discussed above, when modal-conditioning fiber 150 is disposed between MMF 40 and receiver 30, it acts as a modal filter. The smaller core diameter $D_c$ of modal-filter fiber 150 acts to filter out the higher-order modes that can travel in MMF 40. While there is some modal loss, the modulated light 22 from SM transmitter 20 that travels over the optical path will be limited to those modes that travel substantially down the center of the MMF 40 and out to the core diameter $D_c$ of modal-filter fiber 150 so that only the light emitted substantially from the center of MMF 40 is received at receiver 30.

In some embodiments, the core diameter $D_c$ is in the aforementioned range of between 10 μm and 23 μm so that modulated light 22 traveling over fiber 110 and received by receiver 30 is substantially only that associated with the fundamental mode LP01. Consequently, the delay difference between the modes (i.e., the DMD) for the received light after the modal-filtering fiber 150 will be much smaller than the delay difference between the higher-order modes from edge of the core and the center of the core when the modal-filtering fiber 150 is not employed. In an example embodiment, modal-filtering fiber 150 has a core delta $\Delta_0$ in the aforementioned range from 0.2% to 2.0%. Also in an example, modal-filtering fiber 150 can optionally be a bend-insensitive fiber, e.g., by having a trench structure in the refractive index profile.

Some examples of modal-conditioning fiber 150 can have a step refractive index profile with a core delta $\Delta_0$ value of less than 0.5% and core diameter $D_c$ of less than 23 microns. The large-effective-area fibers EX2000® and EX3000® made by Corning, Inc., Corning, N.Y., are example types of fibers that meet these requirements. In some embodiments, modal-conditioning fiber 150 can operate essentially as single-mode fibers at the operating wavelength (e.g., nominally 1300 nm) even though the fiber has a theoretically cutoff above the operating wavelength. To force a few-mode fiber to operate in single mode, a portion of the fiber can be coiled to have a coil diameter within the range of 10 mm to 50 mm.

In some other embodiments, modal-conditional fiber 150 can be gradient index (GRIN) fiber with alpha profile having core delta $\Delta_0$ in the range from 0.3% to 2.0%, and the aforementioned core diameter $D_c$ in the range from 10 microns to 23 microns. In other embodiments, $D_c$≤50 microns.

As explained above in connection with FIGS. 5A through 5C, modal-conditioning fiber 150 can operably disposed in fiber 110 near SM transmitter 20S to serve as a modal-converting fiber, or can be operably disposed near receiver 30 to serve as a modal-filtering fiber. The modal-conditioning fiber 150 can also be used in both locations as illustrated in FIG. 5C, i.e., two modal-conditioning fibers 150 can be employed at the opposite ends of fiber 110. When first and second modal-conditioning fibers 150 are operably disposed adjacent SM transmitter 20S and receiver 30 respectively, in some embodiments the modal-converting fiber and modal filtering fiber are made of the same fiber to simplify the formation of fiber 110.

Figure 5D:
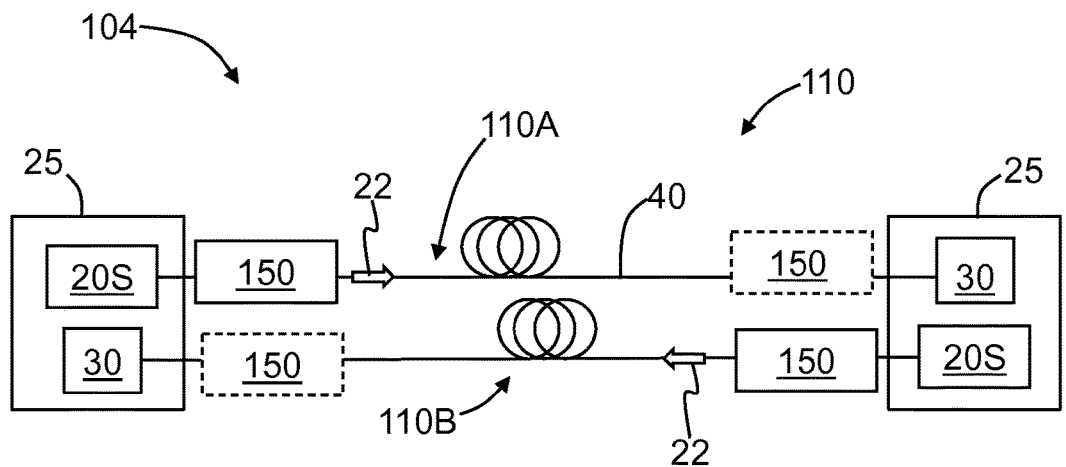
Figure 5E:
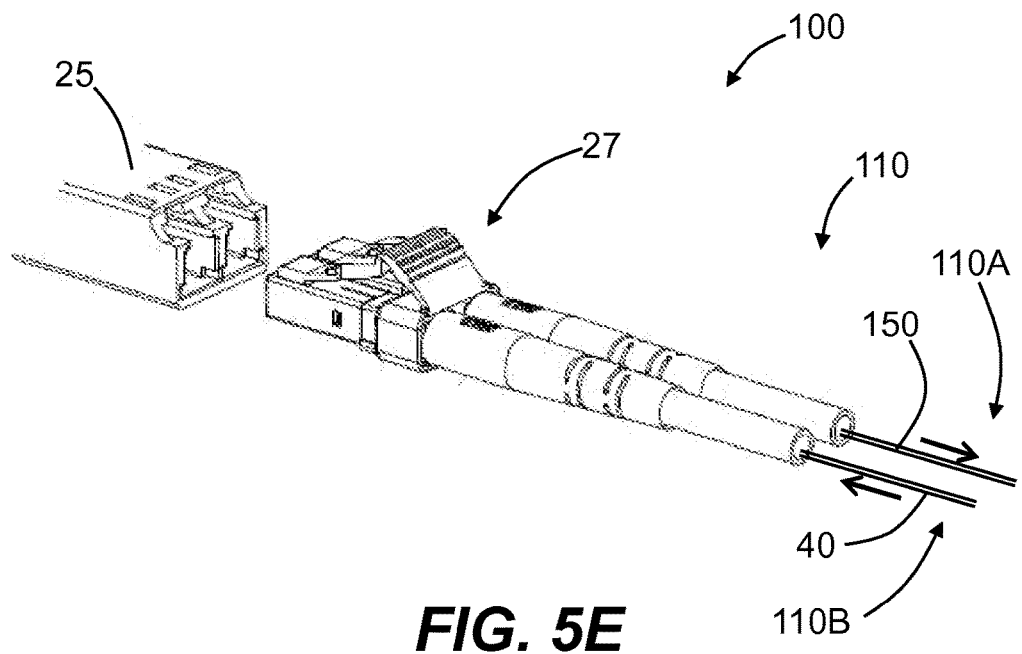
FIG. 5E is a close-up elevated view of one end of the optical transmission system of FIG. 5D and illustrates an example two-fiber transceiver and a pair of duplexed single fiber connectors that terminate the end of a two-fiber optical fiber patch cord.

FIG. 5D is similar to FIGS. 5A through 5C and illustrates an example where there are two transmitters 20S and two receivers 30, with one transmitter and one receiver being part of a transceiver 25, and where there are transceivers at each end of system 104. Fiber 110 includes two sections 110A and 1106 each having an MMF 40 with at least one modal-conditioning fiber 150 operably connected to the MMF 40. With reference to FIG. 5E, in an example, fiber 110 can be terminated at its respective ends with a two-fiber connector 27 that mates with each transceiver 25. In an example, connector 27 can be an MT-RJ® connector or a duplexed single-fiber connector, such as an SC or LC connector, and transceiver 25 can be configured to mate with the particular type of connector used. Transceiver 25 and connectors 27 can also be parallel optic transceiver and connectors.

In an example, at least one modal-conditioning fiber 150 is included at least partially within each two-fiber connector 27, as illustrated in FIG. 5E. Using the same type of modal-conditioning fiber 150 allows for forming fibers 110A and 1106 of fiber 110 without the need to differentiate between fiber types, thereby simplifying the configuration and management of system 104.

In FIG. 5D, the dashed-line boxes for modal-conditioning fibers 150 in fiber sections 110A and 110B illustrate an optional example embodiment where each fiber section 110A and 110B includes two modal-conditioning fibers 150 at each end of the respective MMFs 40. This configuration is amendable to using duplex or two-fiber jumpers, as explained below.

Figure 6:
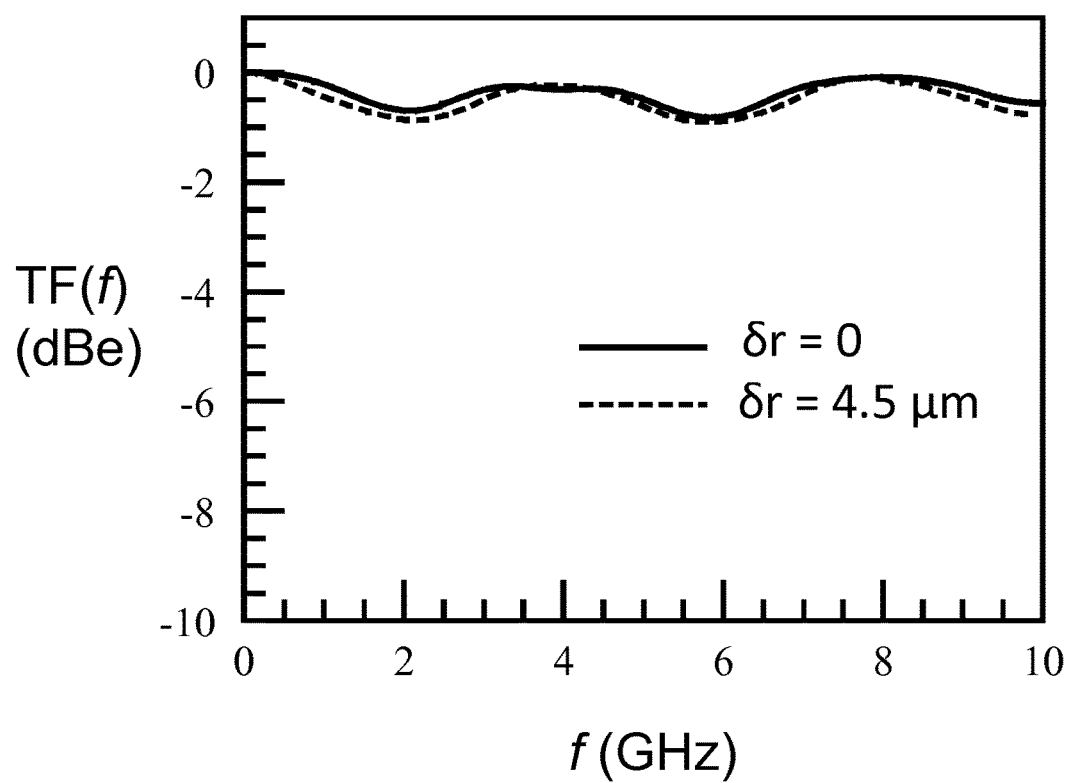
FIG. 6 is a plot of the measured transfer function TF(dBe) versus frequency f (GHz) for a center launch condition (γr=0) and an offset launch condition (δr=4.5 µm) for an example optical fiber having a few meters of single-mode fiber concatenated to a longer length of multimode fiber, and illustrating the relatively large bandwidth over the measured frequency range.

In a simple demonstration of the concept, a section of single-mode fiber 50 of few meters in length was connected to the end of a section of MMF 40 in the measurement system 60 of FIG. 2, and the modal bandwidth of this example fiber 110 was measured. It was found that up to about a radial offset of δr=5 μm, the modal bandwidth BW stayed much higher than 10 GHz·km, which is much higher than the upper limit of the measurement system. The transfer functions TF(f) measured for a center SM launch ($\delta r=0$) and for an offset launch of $\delta r=4.5$ µm are shown in the transfer function plot of FIG. 6. The plot of FIG. 6 shows that up to a frequency f=10 GHz, the transfer function TF(f) is far from dropping to 6 dBe (or 3 dBo) as needed to determine the modal bandwidth. Therefore, the modal bandwidth BW of the example fiber 110 is far greater than 10 Ghz, and is thus more than enough to meet the system reach requirement.

In making the above measurement, the modal bandwidth property of the example fiber 110 was measured by using a single-mode fiber section 50 to launch light from the center of the MMF 40 and another single-mode fiber section 50 placed at the end of the MMF 40 to filter out higher-order modes. The configuration is used for modal bandwidth characterization. The performance of a system with a SM transmitter 20S and MMF 40 are affected not only by the modal bandwidth BW but also the amount of power that can reach the receiver, and by power fluctuations caused by external perturbation of fiber 110.

As discussed above, an example core diameter $D_c$ for modal-condition fiber 150 is in the range from 10 µm to 23 µm to launch substantially only the fundamental mode of the MMF 40. Therefore, when the core diameter $D_c$ for the modal-conditioning fiber 150 is within this select range, it is expected that the modal bandwidth performance would be similar or better than for a fiber 110 having SMF-28® single-mode fibers operably disposed at both ends of the MMF 40.

However, as discussed above, there are additional drawbacks of using SMF-28® single-mode fiber for modal-conditioning fiber 150 in either or both ends of the MMF 40. This is because the core diameter $D_c$ of SMF-28® is too small as compared to the fundamental mode of MMF 40. Consequently, a significant amount of light coming from SM transmitter 20S or the launching SMF-28® single-mode fiber will be lost when the light is received by and attempts to pass through the receiving-end SMF-28® single-mode fiber. Furthermore, the large mismatch in MFD of the LP01 mode between the SMF-28® and the MMF 40 causes excitation of higher-order modes at the launching end of the MMF 40, which degrades the system performance.

With a single span of MMF 40 of 1 km, there is a minimal amount (e.g., 4 dB) optical loss measured at the output of receiving-end SMF-28® single-mode fiber. This optical loss value is smaller for shorter distances of about 400 m to 500 m, e.g., is about 2.5 dB. In practice, when multiple spans of MMFs 40 are used, because of the slight offset at each connecting junction, the received optical power from a SMF-28® single-mode fiber can be much smaller than otherwise expected.

Additionally, the received optical power is also very sensitive to the perturbation of the MMF 40, which is inevitable in the field. Thus, the power fluctuation would be too large (e.g., greater than 1 to 2 dB) to ensure a reliable performance as gauged by a bit error rate measurement. The bit error rate is always measured through using a particular threshold for the received signals. If the overall level of the signal drifts up and down too dramatically, it will result in significant bit errors.

On the other hand, when a modal-conditioning fiber 150 with a larger core is used, the drawback observed for SMF-28® single-mode fiber can be largely eliminated. In the above-described experiments, two short modal-conditioning fibers 150 were made from the aforementioned commercially available EX3000® large-effective-area (and thus large MFD) single-mode fiber with LC connectors placed in both fiber ends. The nominally effective area of EX3000® fiber at 1550 nm is around 150 µm² so that the estimated core diameter $D_c=13.8$ µm, which is close to the optimal value of around 15 µm.

The above-described experiments employed an LRM transceiver 25 operating at about 1310 nm at 10 Gb/s. Note that the receiver 30 of the LRM transceiver 25 is a multi-mode receiver so that it can receive/capture the light output from the fibers used in the experiment. The MMF fiber 110 was formed by four spans of MMF 40 (OM3) with respective length of 300 m, 50 m, 300 m and 100 m, with the total length of 750 m. Each span of the MMF 40 was connectorized with an LC connector 27 and mated together to form a 750 m MMF fiber. Each end of the MMFs 40 was connected with an EX3000® jumper with LC connectors (see FIG. 5E) to form fiber 110. The other end of the EX3000® jumper was plugged into the LRM transceiver 25 in transmitter and receiver ends.

The measured signal was error free for at least 20 minutes before shifting to other testing. By shaking the fiber 110 in several accessible places, the power fluctuation from the output of the EX3000® fiber was only 0.15 dB, which is well within the acceptable range. The use of the EX3000® fiber caused a power loss of around 1.5 dB, as compared to the case without the EX3000® jumper fibers, which is also well within the acceptable range.

In another experiment, a MMF fiber 110 with three spans of MMF 40 (OM3) of respective length of 300 m, 50 m and 300 m was used, for a total MMF length of 650 m. Similar results were obtained, with error free BER performance over 20 minutes and very little power fluctuation due to perturbation.

Figure 7A:
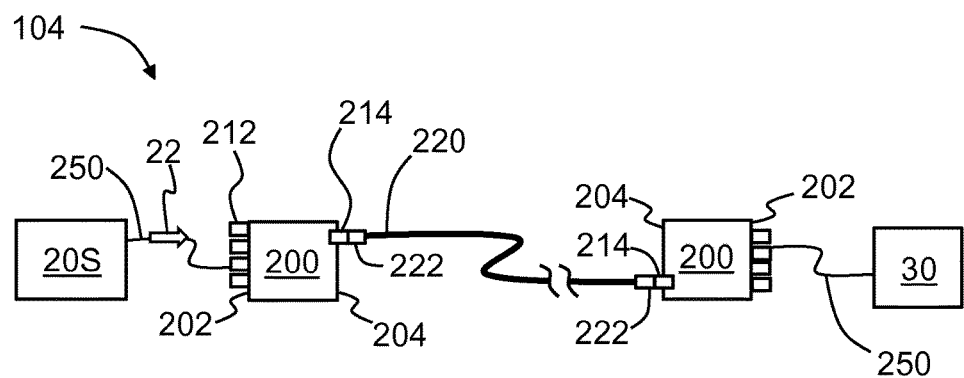
FIG. 7A is a schematic diagram of an example optical transmission system wherein the optical path between the single-mode transmitter and the receiver includes two breakout modules optically connected by a trunk cable, with the modules optically connected to the transmitter and receiver with respective jumper cables.

FIG. 7A is a schematic diagram of an example system 104 wherein the optical path between SM transmitter 20S and receiver 30 includes two breakout modules 200 optically connected by a trunk cable 220. Breakout modules 200 include front and back ends 202 and 204. Trunk cable 220 also includes connectorized ends 222 that are respectively connected to adapters 214 at the back ends 204 of the two breakout modules 200. Connectorized jumper cables or "jumpers" 250 are used to connect SM transmitter 20S to adapters 212 at the front end 202 of the adjacent breakout module 200. Likewise, jumpers 250 are used to connect receiver 30 to adapters 212 the front end 202 of the adjacent breakout module 200.

Figure 7B:
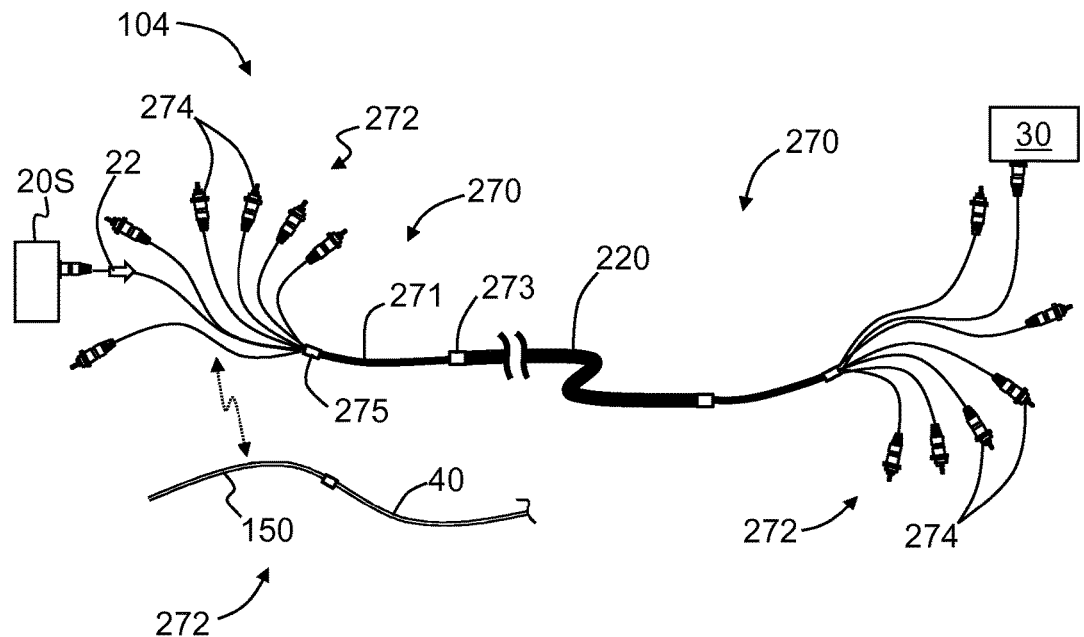
FIG. 7B is a schematic diagram of an example optical transmission system wherein the optical path between the single-mode transmitter and the receiver includes a trunk cable connected to two breakout harnesses that include two connectorized cable sections that respectively attach to the transmitter and receiver.

FIG. 7B is similar to FIG. 7A but instead of breakout modules 200, system 104 instead includes two breakout harnesses 270, e.g., MPO to LC harnesses. The breakout harness 270 includes connectors 274 that obviate the need for jumpers 250 by providing for direct connection to equipment ports.

Figure 7C:
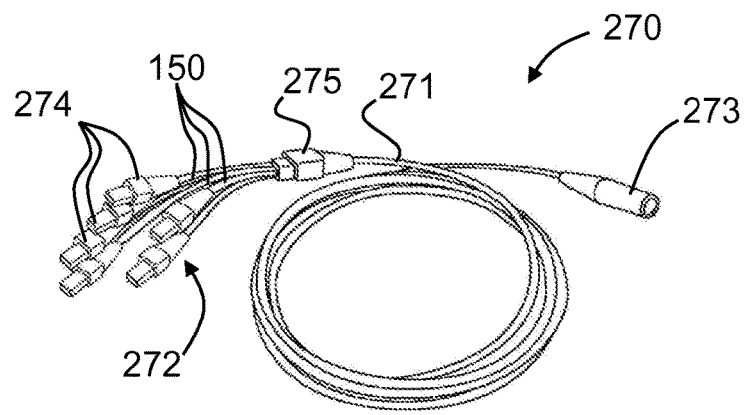
FIG. 7C is an example breakout harness that includes cable sections that each has a section of modal-conditioning fiber.

FIG. 7C shows an example of a breakout harness 270 as shown in FIG. 7B. With respect to FIGS. 7B and 7C, breakout harness (also called a "fan out" cable) 270 includes a main portion 271 that carries (e.g., encases) multiple MMFs 40. The main portion 271 includes a furcation point 275 wherein MMFs 40 from main portion 271 break out at a furcation location 275 into branches or legs 272 having one or more MMFs terminated by connectors 274. Connectors 274 can be, for example, single-fiber connectors, duplex LC-type connectors, etc. At least a portion of legs 272 includes modal-conditioning fiber 150. One end of main portion 271 opposite furcation location 275 is terminated by at least one main connector 273. The configuration of FIG. 7C provides breakout harness 270 with built-in modal-conditioning capability. In an example, breakout harness 270 converts MPO connector input at connector 273 with LC connector output at connectors 272. Other connector formats at either end of breakout harness 270 can also be employed.

Figure 8A:
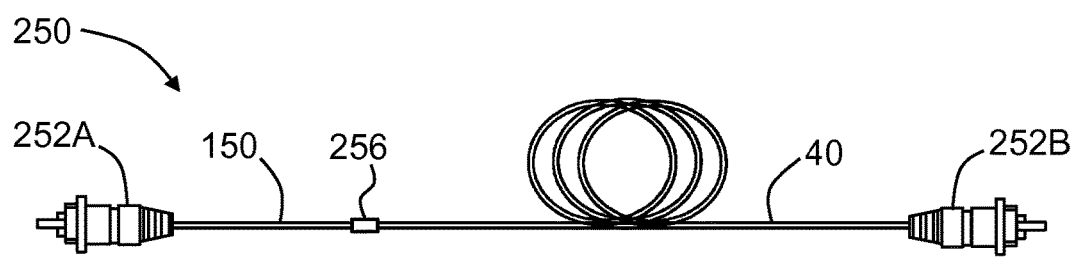
FIG. 8A is a side view of an example jumper that includes a section of modal-conditioning fiber.

FIG. 8A is a close-up view of an example jumper 250. Jumper 250 includes connectors 252A and 252B at opposite ends. Jumper 250 includes a section of modal-conditioning fiber 150 adjacent connector 250A, while the remaining part of the jumper includes MMF 40. The two fibers are shown joined at a location 256, which in an example includes a splice. Jumper 250 thus has built-in modal-filtering capability when used to connect to receiver 30 and built-in modal-converting capability when used to connect to transmitter 20S. In an example, jumper 250 includes indicia that shows where modal-filter fiber 150 is located so that it can be located closest to SM transmitter 20S. In examples, jumper 250 includes two-fiber connectors 252, such as MT-RJ® connectors or duplexed single-fiber connectors, such as SC or LC connectors (see, e.g., FIG. 5E).

Figure 8B:
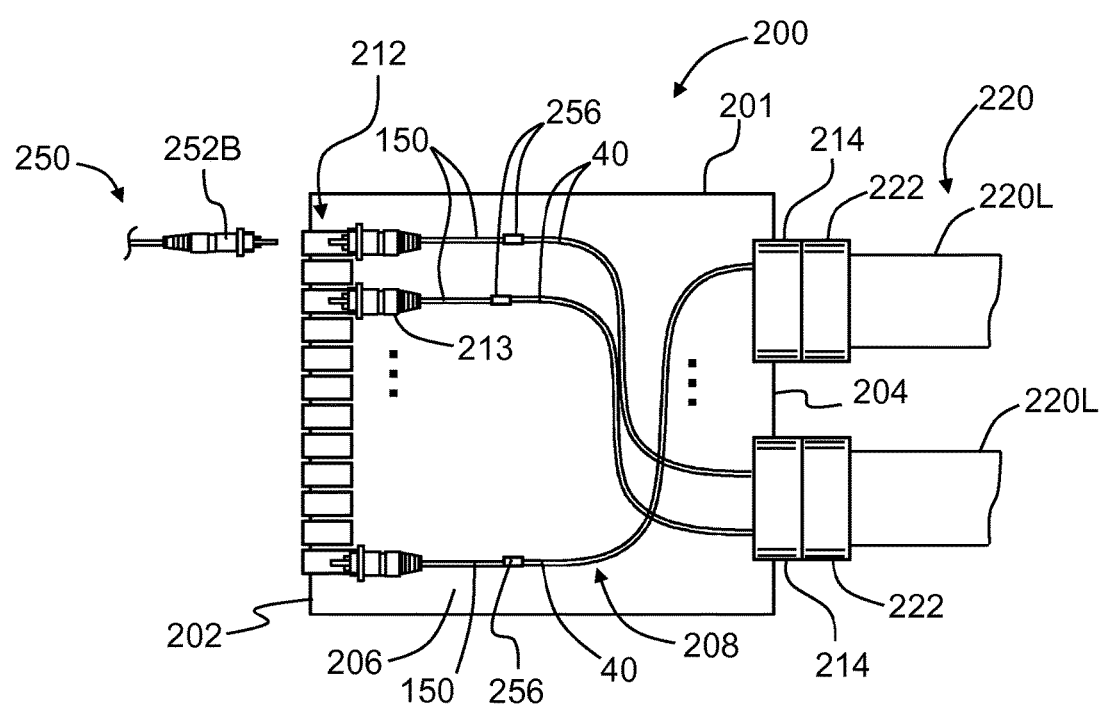
FIG. 8B is a partial cut-away view of an example breakout module wherein the fiber array within the module includes sections of modal-conditioning fiber.

FIG. 8B is a cross-sectional view of an example breakout module 200 that includes a module housing 201 that defines front end 202, back end 204 and an interior 206. Breakout module interior 206 houses fiber arrays 208. The front end 202 of breakout module 200 includes one or more front-end adapters 212, and the back end 204 of breakout module includes one or more back-end adapters 214. Front-end adapters 212 and back-end adapters 214 can be MPO adapters. In an example, front-end adapters 212 can be configured as parallel optic adapters, LC adapters, SC adapters, MT-RJ® adapters, etc.

Fiber array 208 is made up of modal-conditioning fibers 150 optically connected to (e.g., concatenated to) respective MMFs 40, with the ends of the modal-conditioning fibers terminated with connectors 213 inserted into front end adapters 212, and the free ends of the MMF terminated with connectors (not shown) inserted into back-end adapters 214. Fiber array 208 is configured to provide a select optical connection configuration between the front-end and back-end adapters 212 and 214. An example of such a select optical connection configuration is described below.

Trunk 220 is shown by way of example as including two multifiber legs 220L that are respectively optically connected to the two back-end adapters 214 via connectors 222. Likewise, jumpers 250 are optically connected to the front-end 202 of module 200 via front-end adapters 212. Thus, the front-end and back-end adapters 212 and 214 respectively serve to provide connection locations for jumper connectors 252B and trunk connectors 222 to complete the optical path between the SM transmitter 20S and receiver 30, as shown in FIG. 7A.

Other configurations of module 200 are possible, e.g., a single back-end adapter 214 that includes all of the necessary fiber connection locations, different locations and/or orientations for the front-end adapters 212, etc. The configuration of FIG. 8B provides module 200 with built-in modal-conditioning capability.

Figure 8C:
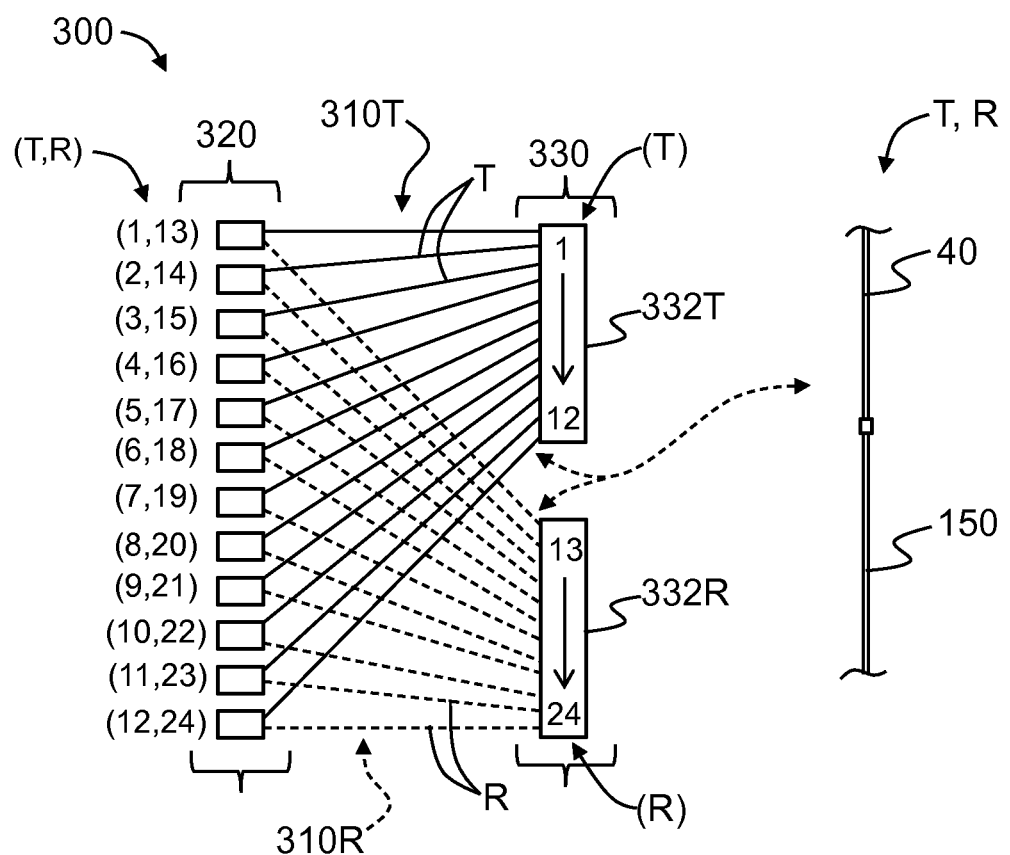
FIG. 8C is a schematic diagram of an example modal-conditioning fiber assembly that includes two fiber arrays each made up of modal-conditioning fibers, wherein the two fiber arrays define select pairings of the modal-conditioning optical fibers from the two modal-conditioning fiber arrays.

FIG. 8C is a schematic diagram of an example embodiment of a modal-conditioning fiber assembly ("fiber assembly") 300. Fiber assembly 300 can be embodied as the above-described breakout module 200 or as the above-described breakout harness 270. Fiber assembly 300 is made up of two fiber arrays 310T and 310R that respectively include modal-conditioning fibers T (solid lines) and R (dashed lines) each formed from a section of MMF 40 and modal-conditioning fiber 150, as illustrated in the close-up inset view on the right-hand-side of the Figure.

The fiber assembly 300 is shown by way of example as including N=24 fibers, with each fiber array 310T and 310R having N/2=12 fibers T and R. In general, N is an even number greater than 2, and the choice of N=24 is simply by way of illustration. In the example, fibers T are numbered 1 through 12 and fibers R are numbered 13 through 24. More generally, for N total fibers, fibers T are numbered 1 through N and fibers R are numbered (N/2)+1 to N.

Fiber assembly 300 includes on one side (the left side) first connection locations 320 where one side of the T and R fibers are terminate in pairs, denoted as (T,R). In example embodiments, the paired connection locations 320 can be defined by one or more connector adapters or one or more fiber connectors, such as duplex connectors, two-fiber connectors, etc., as discussed above in connection with breakout module 200 and breakout harness 270.

Fiber assembly 300 also includes on the other side (the right side) second connection locations 330 where the other side of fibers T and R are terminated in groups or sections, as denoted by (T) and (R). In an example embodiments, connection locations 330 can be defined by one or more connector adapters or one or more fiber connectors, etc., as discussed above in connection with breakout module 200 and breakout harness 270.

In the example shown, two multifiber connectors 332R and 332T are employed that respectively define connection locations 330 for fibers R and T at the right side of fiber assembly 300. In another example, a single connector 332 is used that includes a first row or plane (group) of connection locations for fibers R and a second row or plane (group) of connection locations for fibers T. Thus, connection locations 330 serve to separate and group fibers R and fibers T.

In various examples, modal-conditioning fibers 150 can reside at anywhere between connection locations 320 on the left side of fiber array 300 and connection locations 330 on the right side of the fiber array. Modal conditioning fibers 150 can also span the full distance between connection locations 320 and 330 such that MMF 40 is not part of the modal-conditioning fiber assembly 300.

In a preferred embodiment system polarity is maintained by defining duplexed fiber pairs for fiber assembly 300 denoted in shorthand as (T),(R)→(T,R), wherein the pairings (T,R) of transmit and receive fibers T and R at the left side can be written as (T,R), where T=1 to (N/2) and R=((N/2)+1) to N. This configuration of fibers T and R within fiber assembly 300 reduces manufacturing complexity in instances where performance optimization or cost considerations may dictate that only modal-converting fibers or modal-filtering fibers be used, or if modal-converting fibers and modal-filtering fibers are required to be of different fiber types. It is further disclosed that proper maintenance of system polarity requires that the connectors of trunk 220 be mated to fiber assembly 300 at each end of the trunk in a manner so that each transmit fiber of fiber array 310T on each end of the trunk 220 is placed in optical communication with a receive fiber of fiber array 310R on the other end of the trunk and that the fiber paths so formed should be paired at each end as described above. As an example, for a 24-fiber trunk 220 of FIG. 8B having two legs 220L on each end, each leg terminated with a 12-fiber MPO connector and subsequently mated on each end to a fiber assembly embodying the schematic diagram 300 of FIG. 8C and where 332T and 332R are 12-fiber MPO style connectors, the desired polarity can be achieved by orienting and terminating the fibers of each trunk leg 220L on one end of the trunk into the MPO connectors in a forward fiber order from 1 to 12 and orienting and terminating the fibers of each trunk leg 220L on the other end of the trunk into the MPO connectors in a reverse fiber order from 12 to 1. The trunk leg 220L mated to connector 332T at one end of the trunk and the trunk leg 220L mated to connector 332R at the other end of the trunk must be in optical communication with one another.

Aspects of the disclosure include providing modal-filter fiber 150 at one or more components of system 104, e.g., in jumpers 250 at one or both ends of the system; in breakout module 200; in breakout harness 270; in fiber assembly 300; in connectors used anywhere along the optical path to establish an optical connection for the optical path; or in a combination of these components. Likewise, aspects of the disclosure include providing modal-conditioning fiber 150 at one or both ends of MMF 40, as shown in the embodiments of FIGS. 5A through 5D. The relatively short length $L_F$ of mode-conditioning fiber 150 allows for one or more modal-conditioning fibers to constitute relatively small portions of the optical path, such as small enough to fit at least partially within or entirely within the aforementioned connectors. When convenient, the length $L_F$ of modal-conditioning fiber 150 can be made longer than 2 cm, e.g., it can be a meter or many meters long.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A fiber assembly of N fibers, comprising:
    a first fiber array, T, comprising a first plurality of fibers, and a second fiber array, R, comprising a second plurality of fibers, wherein a first end of each fiber of the first fiber array, T, terminates at a first connection location and a first end of each fiber of the second fiber array, R, terminates at a second connection location,
    wherein a second end of a first fiber in the first fiber array, T, is paired with a second end of a first fiber of the second fiber array, R, at a third connection location,
    wherein at least one fiber of the first fiber array, T, or at least one fiber of the second fiber array, R, comprises at least one modal-conditioning fiber section and at least one multimode fiber section,
    wherein the at least one modal-conditioning fiber section has a length of 5 mm or greater and a core diameter $D_c$ in the range from 10 microns to 23 microns, the at least one modal-conditioning fiber section being configured to serve as at least one of:
        a modal-converting fiber configured to convert an optical signal from a higher mode to a lower mode; or
        a modal-filter fiber configured to allow transmission of an optical signal of a lower mode through the modal-filter fiber and block transmission of an optical signal of a higher mode through the modal-filter fiber, and
    wherein the at least one multimode fiber section has a core diameter of 50 microns and mode-field diameter of a fundamental mode LP01 of about 15 microns at a 1310 nm wavelength.

2. The fiber assembly according to claim 1, wherein the fiber assembly is configured as either a breakout module or a breakout harness.

3. The fiber assembly of claim 1, wherein the first fiber array, T, comprises fibers 1 to N/2 and the second fiber array, R, comprises fibers [(N/2)+1] to N, where N is an even number greater than 2.

4. The fiber assembly of claim 1, wherein at least one fiber of the first fiber array, T, is differentiated from at least one fiber of the second fiber array, R, by at least one characteristic.

5. The fiber assembly of claim 4, wherein the at least one characteristic is refractive index profile, core size, mode field diameter, cladding diameter, composition, or length.

6. The fiber assembly of claim 4, wherein the at least one characteristic is bandwidth-distance product, skew, differential modal delay, attenuation performance, bend sensitivity, modal dispersion, chromatic dispersion, polarization mode dispersion, cutoff wavelength, or transmission modes supported under given operating conditions.

7. The fiber assembly of claim 4, wherein the at least one characteristic is length.

8. The fiber assembly of claim 1, wherein a second end of a second fiber in the first fiber array, T, is paired with a second end of a second fiber of the second fiber array, R, at a fourth connection location.

9. The fiber assembly of claim 8, wherein each of the third and fourth connection location comprises a respective pair of adjacent optical pathways in a single multifiber connector.

10. The fiber assembly of claim 8, wherein the third connection location comprises a first duplex fiber connector and the fourth connection location comprises a second duplex fiber connector.

11. The fiber assembly of claim 1, wherein the at least one modal-conditioning fiber section is configured to serve as a modal-converting fiber.

12. The fiber assembly of claim 11, wherein the at least one modal-conditioning fiber section is configured to convert the optical signal to a the fundamental mode LP01 of the at least one modal-conditioning fiber section.

13. The fiber assembly of claim 11, wherein the at least one modal-conditioning fiber section is positioned between a single mode transmitter and the at least one multimode fiber section.

14. The fiber assembly of claim 1, wherein the at least one modal-conditioning fiber section is configured to serve as a modal-filter fiber.

15. The fiber assembly of claim 14, wherein the at least one modal-conditioning fiber is positioned between a multimode fiber and an optical receiver.

16. The fiber assembly of claim 1, wherein the at least one modal-conditioning fiber section is configured to serve as a modal-converting fiber and a modal-filter fiber.

17. The fiber assembly of claim 1, wherein the at least one modal-conditioning fiber section has a core delta $\Delta_0$ in the range $0.2 \leq \Delta_0 \leq 2.0\%$.

* * * * *